United States Patent
Krishnakumar et al.

(10) Patent No.: US 11,152,811 B2
(45) Date of Patent: Oct. 19, 2021

(54) SYSTEM AND METHOD OF OPERATING AN INFORMATION HANDLING SYSTEM

(71) Applicant: Dell Products L.P., Round Rock, TX (US)

(72) Inventors: Karthikeyan Krishnakumar, Austin, TX (US); Hsu Feng Lee, Taipei (TW)

(73) Assignee: Dell Products L.P., Round Rock, TX (US)

( * ) Notice: Subject to any disclaimer, the term of this patent is extended or adjusted under 35 U.S.C. 154(b) by 290 days.

(21) Appl. No.: 15/783,848

(22) Filed: Oct. 13, 2017

(65) Prior Publication Data

US 2019/0115780 A1   Apr. 18, 2019

(51) Int. Cl.
| | |
|---|---|
| G06F 1/3206 | (2019.01) |
| H02J 7/02 | (2016.01) |
| H04B 5/00 | (2006.01) |
| H02J 50/10 | (2016.01) |
| H02J 50/80 | (2016.01) |
| G06F 9/4401 | (2018.01) |

(52) U.S. Cl.
CPC ............ *H02J 7/025* (2013.01); *G06F 1/3206* (2013.01); *H02J 50/10* (2016.02); *H02J 50/80* (2016.02); *H04B 5/0037* (2013.01); *G06F 9/4406* (2013.01)

(58) Field of Classification Search
None
See application file for complete search history.

(56) References Cited

U.S. PATENT DOCUMENTS

| | | |
|---|---|---|
| 3,757,306 A | 9/1973 | Boone |
| 4,074,351 A | 2/1978 | Boone et al. |
| 5,748,981 A | 5/1998 | Patchen et al. |
| (Continued) | | |

OTHER PUBLICATIONS

Johns, Bill. "An introduction to the Wireless Power Consortium standard and TI's compliant solutions." Analog Applications Journal Q 1 (2011); 5 pages, 2011.

(Continued)

*Primary Examiner* — Paul Yen
(74) *Attorney, Agent, or Firm* — Baker Botts L.L.P.

(57) ABSTRACT

In one or more embodiments, a wireless communications device of an information handling system may receive wireless power from a wireless charging unit, coupled to a wireless docking device; in response to receiving the wireless power from the wireless charging unit, the wireless communications device of the information handling system may establish wireless communications with a wireless communications device of the wireless charging unit; the wireless communications device of the information handling system may wirelessly receive information from the wireless communications device of the wireless charging unit; the wireless communications device of the information handling system may provide the information to an embedded controller of the information handling system; and the embedded controller may perform an action associated with the information handling system. In one or more embodiments, the information may include a state transition command configured to transition the information handling system to an information processing state.

9 Claims, 5 Drawing Sheets

(56) References Cited

U.S. PATENT DOCUMENTS

| | | | | |
|---|---|---|---|---|
| 2004/0204172 | A1* | 10/2004 | Herle | H04W 24/00 |
| | | | | 455/572 |
| 2008/0270811 | A1* | 10/2008 | Chow | G06F 1/32 |
| | | | | 713/323 |
| 2015/0082061 | A1* | 3/2015 | Ramirez | G06F 1/1632 |
| | | | | 713/323 |
| 2015/0171930 | A1* | 6/2015 | Joehren | H04B 5/0031 |
| | | | | 455/41.1 |
| 2018/0321728 | A1* | 11/2018 | Morse | G06F 1/3209 |

OTHER PUBLICATIONS

Borghino, Dario. "New wireless power tech can charge multiple devices in any orientation." News Atlas, Jul. 10, 2015; 27 pages, Jul. 10, 2015.

Manivannan, P., and S. Bharathiraja. "Qi open wireless charging standard—A wireless technology for the future." Int. J. Eng. Comput. Sci. 2.3 (2013): 573-579; 7 pages, 2013.

Corporation, Hewlett Packard. "Advanced Configuration and Power Interface Specification." Revision 3, Sep. 2, 2004; 618 pages, 2004.

Wireless Power Consortium. "The Qi Wireless Power Transfer System Power Class 0 Specification." Part 4: Reference Designs, Version 1.2.2, Apr. 2016; 309 pages, Apr. 2016.

Panasonic. "Integrated Wireless Power Supply Receiver, Qi (Wireless Power Consortium) Compliant." Version 2.00, An32258A, Oct. 22, 2014; 31 pages, Oct. 22, 2014.

Gao, Xiang. "Demodulating Communication Signals of Qi-Compliant Low-Power Wireless Charger Using MC56F8006 DSC." Freescale Semiconductor, 2013; 21 pages, 2013.

Wireless Power Consortium. "The Qi Wireless Power Transfer System Power Class 0 Specification." Part 1 and 2: Interface Definitions, Version 1.2.2, Apr. 2016; 160 pages, Apr. 2016.

Texas Instruments. "bq51003 Highly Integrated Wireless Receiver Qi (WPC v1.1) Compliant Power Supply." Jun. 2016; 39 pages, Jun. 2016.

Stellaris LM3S6965 Evaluation Board—User's Manual, Texas Instruments, Jan. 6, 2010, Jan. 6, 2010.

Mixed Signal Microcontroller, SLAS734F—Apr. 2011—Revised May 2013, Texas Instrument. May 2013.

8-bit AVR with 8K Bytes In-System Programmable Flash—ATmega 8, ATmega8L, Atmel Corporation, 2006, 2006.

Tiva TM4C123GH6ZXR Microcontroller—Data Sheet, Texas Instruments—Production Data, Jun. 12, 2014, Jun. 12, 2014.

MCS 51 Microcontroller Family User's Manual, Intel, Feb. 1994, Feb. 1994.

Bob Koehler, "8051 Single-Chip Microcomputer Architectural Specification and Functional Description—Architectural Specification Preliminary", Intel, May 1980, May 1980.

John Wharton, "An Introduction to the Intel MCS-51 Single-Chip Microcomputer Family", Intel, May 1980, May 1980.

Microsoft Computer Dictionary, Fifth Edition, 2002, 2002.

\* cited by examiner

SYSTEM AND METHOD OF OPERATING AN INFORMATION HANDLING SYSTEM

BACKGROUND

Field of the Disclosure

This disclosure relates generally to information handling systems and more particularly to operating information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, a wireless communications device of an information handling system may receive wireless power from a wireless charging unit, coupled to a wireless docking device. For instance, in response to receiving the wireless power from the wireless charging unit, the wireless communications device of the information handling system may establish wireless communications with a wireless communications device of the wireless charging unit. The wireless communications device of the information handling system may wirelessly receive information from the wireless communications device of the wireless charging unit and may provide the information to an embedded controller of the information handling system. In one or more embodiments, the embedded controller may perform an action associated with the information handling system. For example, the embedded controller may transition states of the information handling system. For instance, the embedded controller may, based at least on the information, transition states of the information handling system. In one or more embodiments, a wireless docking system may include a wireless communication device configured to wirelessly communicate with another wireless communications device of an information handling system and wirelessly provide the information to the other wireless communication device. For example, the information may be configured to transition the information handling system from a power conservation state to an information processing state. In one or more embodiments, the wireless docking system may be configured to receive user input and wirelessly provide the information in response to receiving the user input. In one example, the wireless docking system may include a button that is configured to receive the user input. In another example, the wireless docking system may be coupled to one or more of a keyboard and a pointing device, among others. For instance, the user input may be received via the one or more of the keyboard and the pointing device.

In one or more embodiments, a wireless communications device of an information handling system, in a power conservation state, may receive wireless power from a wireless charging unit, coupled to a wireless docking device. For instance, in response to receiving the wireless power from the wireless charging unit, the wireless communications device of the information handling system may establish wireless communications with a wireless communications device of the wireless charging unit. The wireless communications device of the information handling system may wirelessly receive a state transition command from the wireless communications device of the wireless charging unit and may provide the state transition command to an embedded controller of the information handling system. In one or more embodiments, the embedded controller may transition the information handling system from the power conservation state to an information processing state. For example, the embedded controller may transition the information handling system from the power conservation state to the information processing state in response to receiving the state transition command. In one or more embodiments, a wireless docking system may include a wireless communication device configured to wirelessly communicate with another wireless communications device of an information handling system and wirelessly provide a state transition command to the other wireless communication device. For example, the state transition command may be configured to transition the information handling system from a power conservation state to an information processing state. In one or more embodiments, the wireless docking system may be configured to receive user input and wirelessly provide the state transition command in response to receiving the user input. In one example, the wireless docking system may include a button that is configured to receive the user input. In another example, the wireless docking system may be coupled to one or more of a keyboard and a pointing device, among others. For instance, the user input may be received via the one or more of the keyboard and the pointing device.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, an information handling system (IHS) may be utilized with a wireless docking system. For example, the IHS may be in one of various states. For instance, the various states may be or include Advanced Configuration and Power Interface (ACPI) states. In one or more embodiments, a power conservation state may include a sleep state. For example, a sleep state may include "S1", "S2", "S3", "S4", or "S5". In one instance, state "S1" may include a state where the IHS is powered on, and a processor of the IHS may not executing instructions and may not be ready to execute instructions, although its registers and caches may be maintained. In a second instance, state "S2" may include a state where the IHS is powered on, and a processor of the IHS may not executing instructions, is not ready to execute instructions, may not maintain its registers, and may not maintain its cache, although a volatile storage (e.g., random access memory) may be maintained. In a third instance, state "S3" may include a state where the IHS is powered on, and a processor may not executing instructions, is not ready to execute instructions, may not maintain its registers, and may not maintain its cache, although a volatile storage (e.g., random access memory) may be maintained with a slower refresh rate with dirty pages flushed to a non-volatile storage medium. In a fourth instance, state "S4" may include a state where the IHS is powered off with volatile storage (e.g., random access memory) flushed (e.g., stored) to a non-volatile storage medium and with any communications device powered off (e.g., a wireless Ethernet communications device, a Bluetooth communications device, a WiGig communications device, etc.). In a fifth instance, state "S5" may include a state where the IHS is powered off with volatile storage (e.g., random access memory) flushed (e.g., stored) to a non-volatile storage medium and with communications devices powered off (e.g., a wireless Ethernet communications device, a Bluetooth communications device, a WiGig communications device, etc.), and an operating system may be booted when the IHS returns to an information processing state. In one or more embodiments, a state "S0" may include the IHS in a working state. For example, a processor of the IHS may be executing instructions or may be ready to execute instructions and a volatile memory medium (e.g., random access memory) may be continually refreshed. For instance, the working state may be or include an information processing state.

In one or more embodiments, the IHS may be in a power conservation state (e.g., a sleep state), and a wireless docking system may transition the IHS from the power conservation state to an information processing state (e.g., a working state). For example, the wireless docking system may receive user input, and in response to the user input, the wireless docking system may transition the IHS from the power conservation state to the information processing state. For instance, the wireless docking system may wirelessly provide a state transition command to the IHS to transition the IHS from the power conservation state to the information processing state. In one or more embodiments, the IHS may include a wireless communications device that may be wirelessly powered by the wireless docking system. For example, the wireless communications device of the IHS may not be powered by a power source of the IHS (e.g., a battery of the IHS). For instance, a wireless communications device of the wireless docking system may provide the state transition command to the wireless communications device of the IHS.

Figure 1:
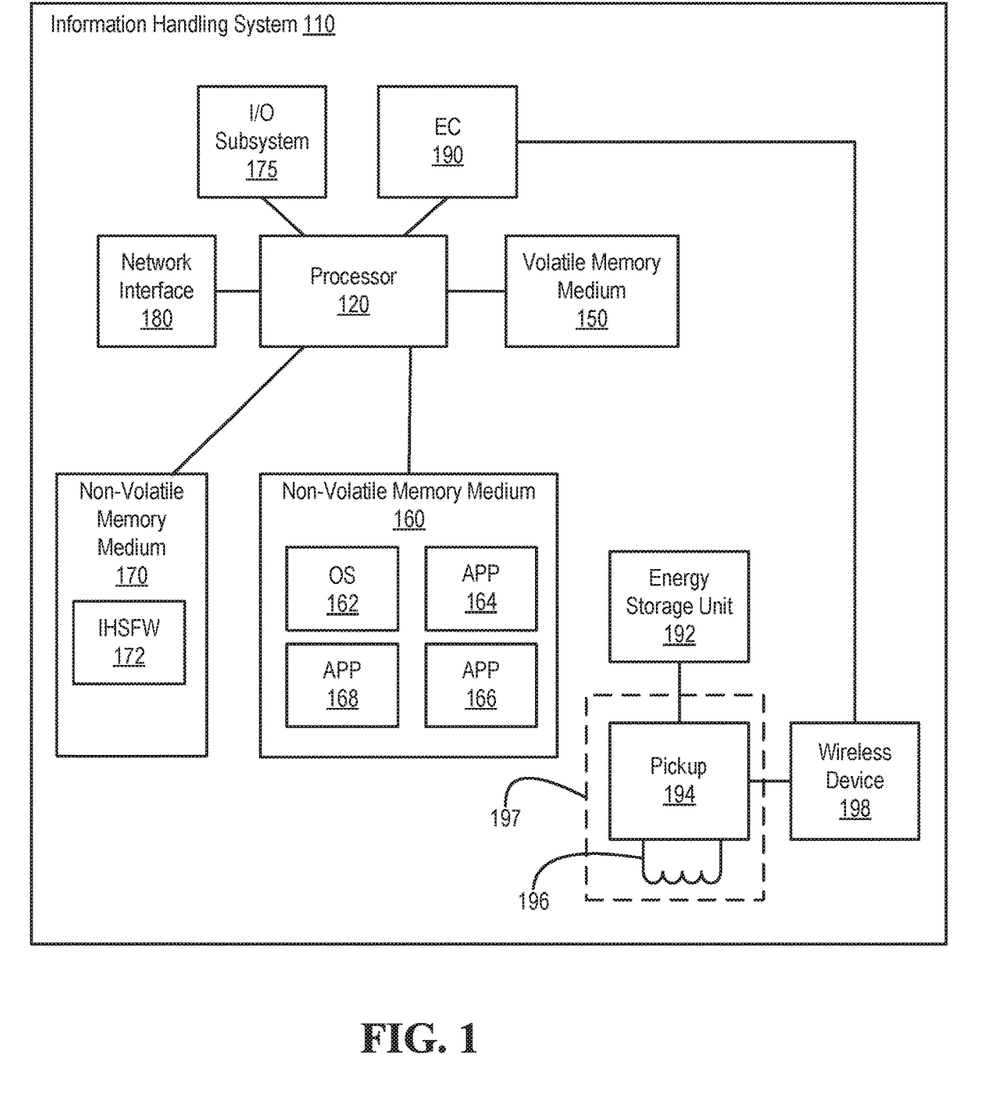
FIG. 1 illustrates an example of an information handling system, according to one or more embodiments.

Turning now to FIG. 1, an exemplary information handling system is illustrated, according to one or more embodiments. An IHS 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAIVI (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, network interface 180 may be wirelessly communicatively coupled to a wireless docking system. For example, network interface 180 may wirelessly communicate information with the via wireless docking system one or more of WiGig, WiFi, wireless Ethernet, ultrawideband, Institute of Electrical and Electronics Engineers (IEEE) 802.11, and wireless USB, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an ACPI, among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

As shown, IHS 110 may include an energy storage unit 192. For example, energy storage unit 192 may be or include a power supply that may supply power to one or more elements of IHS 110. In one or more embodiments, energy storage unit 192 may be or may include one or more of a rechargeable battery and a capacitor, among others. In one example, the rechargeable battery may store energy via chemical energy. In another example, the capacitor may store energy via an electric field. In one or more embodiments, energy storage unit 192 may provide power to one or more elements of IHS 110, among others. As illustrated, IHS 110 may include a pickup 194 and a coil 196. In one or more embodiments, pickup 194 and coil 196 may form and/or implement a wireless power receiver 197. For example, wireless power receiver 197 may receive power via one or more magnetic fields. As shown, coil 196 may be coupled to pickup 194, and pickup 194 may be coupled to energy storage unit 192. In one or more embodiments, coil 196 may capture and/or receive one or more magnetic fields. For example, coil 196 may provide voltage and current from the one or more magnetic fields to pickup 194. As shown, IHS 110 may include a wireless device 198 coupled to EC 190. For example, wireless device 198 may be or include a Bluetooth communications device. In one or more embodiments, pickup 194 may be coupled to energy storage unit 192 and/or wireless device 198 and/or may provide regulated voltage and/or current to energy storage unit 192 and/or wireless device 198. For example, wireless device may draw power from wireless power receiver 197 without drawing power from energy storage unit 192.

In one or more embodiments, processor 120 and one or more components of IHS 110 may be included in a system-on-chip (SoC). For example, the SoC may include processor 120 and a platform controller hub (not specifically illustrated).

In one or more embodiments, EC 190 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP 430 microcontroller, an Argonaut RISC Core (ARC) embedded processor, an Andes core embedded processor, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein. In one or more embodiments, EC 190 may be configured, coded, and/or encoded with instructions in accordance with one or more of systems, flowcharts, methods, and/or processes described herein and perform one or more functions and/or operations independently of processor 120.

Figure 2:
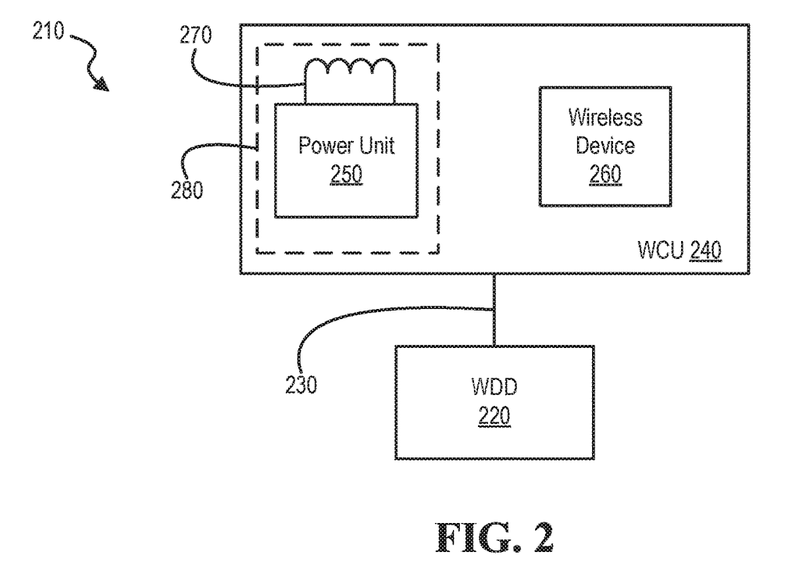
FIG. 2 illustrates an example of a wireless docking system, according to one or more embodiments.

Turning now to FIG. 2, a wireless docking system is illustrated, according to one or more embodiments. As shown, a wireless docking system 210 may include a wireless docking device (WDD) 220, a coupling 230, and a wireless charging unit (WCU) 240. In one or more embodiments, coupling 230 may be utilized in transferring power to WCU 240 and in transferring communications between WDD 220 and WCU 240. In one example, coupling 230 may be or include a USB-C coupling and/or cable. In another example, coupling 230 may be or include a Thunderbolt coupling and/or cable.

As illustrated, WCU 240 may include a power unit 250, a wireless device 260, and a coil 270. For example, wireless device 260 may be or include a Bluetooth communications device. In one or more embodiments, coil 270 may include multiple coils. As shown, power unit 250 may be coupled to coil 270. As illustrated, coil 270 may be coupled to power unit 250. In one or more embodiments, coil 270 may provide and/or transmit one or more magnetic fields. For example, one or more magnetic fields may be powered via power unit 250. In one or more embodiments, power unit 250 and coil 270 may form and/or implement a wireless power transmitter 280 that may transmit power via one or more magnetic fields. In one or more embodiments, wireless device 260 and wireless device 198 may communicate information in a wireless fashion. For example, each of wireless device 260 and wireless device 198 may communicate information via near field communications, Bluetooth (e.g., based on IEEE 802.15), IEEE 802.15.4, and/or ZigBEE, among others.

Figure 3:
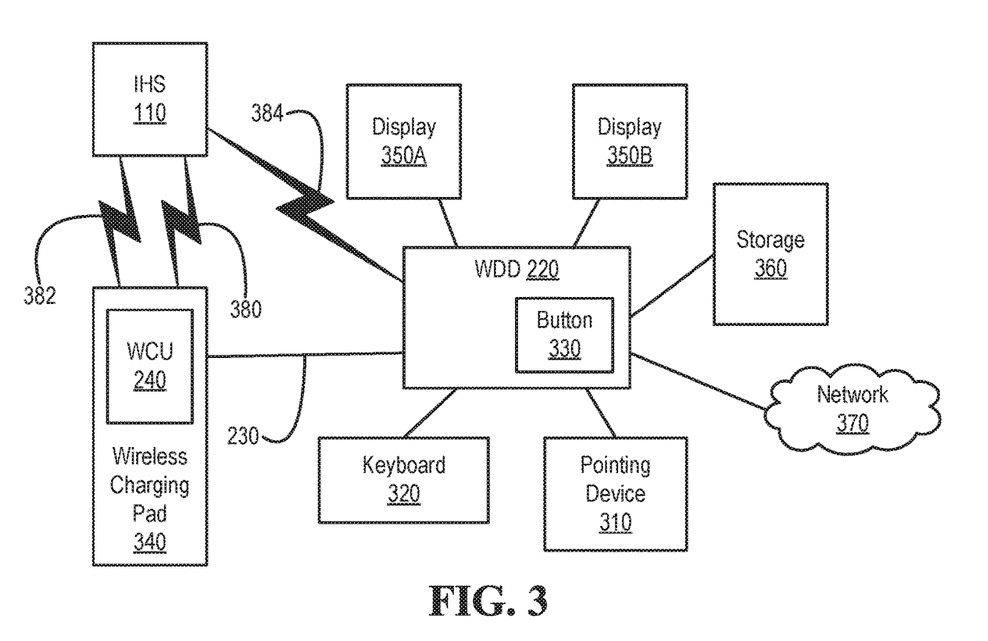
FIG. 3 illustrates an example of user input devices coupled to a wireless docking device, according to one or more embodiments.

In one or more embodiments, WDD 220 may include and/or be coupled to one or more user input devices, as illustrated in FIG. 3. In one example, the one or more user input devices may include one or more of a pointing device 310 (e.g., a mouse, a stylus, a touchpad, a trackball, etc.) and a keyboard 320, among others. In another example, the one or more user input devices may include a button 330 that may be actuated by a user. In one instance, button 330 may be or include a mechanical switch. In another instance, button 330 may be or include a capacitive sensing device that may implement a switch and/or may provide a signal when a user touches button 330, which may indicate user input. In one or more embodiments, when a user actuates and/or utilizes at least one of the one or more user input devices, WDD 220 may provide one or more wireless signals 380 to IHS 110 that may restore IHS 110 to a working state (e.g., an information processing state), from a sleeping state. For example, the sleeping state may be or include a power conservation state.

As illustrated, WDD 220 may be coupled to a wireless charging pad 340 via coupling 230. For example, wireless charging pad 340 may be or include a wireless charging mat. In one or more embodiments, wireless charging pad 340 may include WCU 240. For example, IHS 110 may be placed on wireless charging pad 340. For instance, WCU 240 may provide wireless power 382 via one or more magnetic fields. As shown, WDD 220 may be coupled to a network 370. In one or more embodiments, network 370 may include a wired network, a wireless network, an optical network, or a combination of the foregoing, among others. For example, network 370 may include and/or be coupled to various types of communications networks. For instance, network 370 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others. As illustrated, IHS 110 may wirelessly communicate with WDD 220.

In one or more embodiments, WDD 220 and IHS 110 may wireless communicate information via one or more of WiGig, WiFi, wireless Ethernet, ultrawideband, IEEE 802.11, and wireless USB, among others. For example, WDD 220 and IHS 110 may wireless communicate information via wireless signals 384. In one instance, IHS 110 may utilize one or more of displays 350A and 350B (coupled to WDD 220), via wireless signals 384, to provide information to a user. In a second example, IHS 110 may utilize network 370 via wireless signals 384 and WDD 220. In a third example, WDD 220 may provide one or more state transition commands via wireless signals 284. In another example, IHS 110 may utilize a storage 360 (coupled to WDD 220), via wireless signals 384, to store and/or retrieve information. In one or more embodiments, storage 360 may be or include a non-volatile memory medium.

In one or more embodiments, wireless signals 384 and WDD 220 may permit and/or allow one or more devices coupled to WDD 220 to communicate with IHS 110 as if the one or more devices coupled to WDD 220 were coupled to IHS 110. For example, wireless signals 384 and WDD 220 may permit and/or allow one or more devices coupled to WDD 220 to communicate with IHS 110 as if the one or more devices coupled to WDD 220 were coupled to IHS 110 in a wired fashion or in a wireless fashion.

Figure 4A:
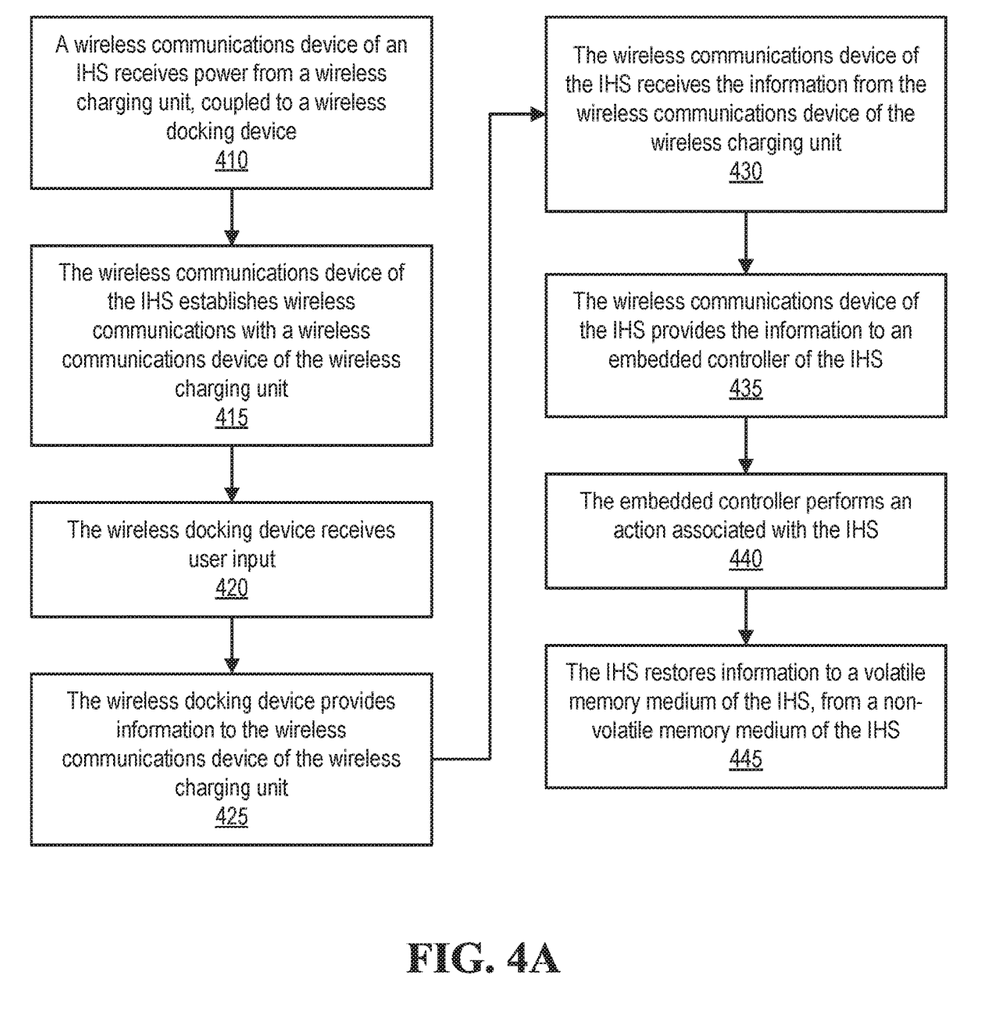
FIGS. 4A and 4B illustrate example methods of operating an information handling system, according to one or more embodiments.

Turning now to FIG. 4A, a method of operating an information handling system, according to one or more embodiments. At 410, a wireless communications device of an information handling system may wirelessly receive wireless power from a wireless charging unit, coupled to a wireless docking device. For example, wireless device 198 may receive wireless power from WCU 240. In one instance, wireless device 198 receiving wireless power from WCU 240 may include wireless device 198 receiving power from WCU 240 via power unit 250, coil 270, coil 196, and pickup 194. In a second instance, wireless device 198 receiving power from WCU 240 may include wireless device 198 receiving power from WCU 240 without receiving power from a power supply (e.g., energy storage unit 192) of IHS 110. In another instance, wireless device 198 receiving wireless power from WCU 240 may include wireless device 198 receiving power from wireless power transmitter 280.

In one or more embodiments, the information handling system may be in a power conservation state, and the wireless communications device of the information handling system, in the power conservation state, may wirelessly receive wireless power from a wireless charging unit, coupled to a wireless docking device. For example, IHS 110 may be in a power conservation state, and wireless device 198 may receive wireless power from WCU 240. In one instance, wireless device 198 receiving wireless power from WCU 240 may include wireless device 198 receiving power from WCU 240 via power unit 250, coil 270, coil 196, and pickup 194. In a second instance, wireless device 198 receiving power from WCU 240 may include wireless device 198 receiving power from WCU 240 without receiving power from a power supply (e.g., energy storage unit 192) of IHS 110. In another instance, wireless device 198 receiving wireless power from WCU 240 may include wireless device 198 receiving power from wireless power transmitter 280.

At 415, the wireless communications device of the information handling system may establish wireless communications with a wireless communications device of the wireless charging unit. For example, wireless device 198 may establish wireless communications with wireless device 260. In one or more embodiments, the wireless communications device of the information handling system may establish wireless communications with the wireless communications device of the wireless charging unit in response to receiving the power from the wireless charging unit. For example, wireless device 198 may establish wireless communications with wireless device 260 in response to receiving the power from WCU 240.

At 420, the wireless docking device may receive user input. For example, WDD 220 may receive user input. For instance, WDD 220 may receive user input via one or more of pointing device 310, keyboard 320, and button 330, among others. At 425, the wireless docking device may provide information to the wireless communications device of the wireless charging unit. For example, WDD 220 may provide the information to wireless communications device 260. In one or more embodiments, the information may include a state transition command. For example, the wireless docking device may provide the state transition command to the wireless communications device of the wireless charging unit in response to the user input.

At 430, the wireless communications device of the information handling system may receive the information from the wireless communications device of the wireless charging unit. For example, wireless communications device 198 may receive the information from wireless communications device 260. For instance, the information may include the state transition command, and wireless communications device 198 may receive the state transition command from wireless communications device 260. At 435, the wireless communications device of the information handling system may provide the information to an embedded controller of the information handling system. For example, wireless communications device 198 may provide the information to EC 190. For instance, the information may include the state transition command, and wireless communications device 198 may provide the state transition command to EC 190.

At 440, the embedded controller may perform an action associated with the information handling system. For example, the action may control and/or transition one or more portions of the information handling system. In one or more embodiments, the action may include transitioning states of the information handling system. For example, the embedded controller may transition the information handling system to an information processing state. For instance, EC 190 may transition IHS 110 to an information processing state (e.g., a state "S0"). In one or more embodiments, the embedded controller may perform the action associated with the information handling system in response to receiving the information. For example, the information may include the state transition command, and the embedded controller may transition the information handling system to an information processing state in response to receiving the state transition command. In one instance, the state transition command may indicate that the information handling system is to be transitioned to the information processing state. In another instance, the information handling system may be in a power conservation state, and the embedded controller may transition the information handling system from the power conservation state to the information processing state in response to receiving the state transition command.

At 445, the information handling system may restore stored information to a volatile memory medium of the information handling system, from a non-volatile memory medium of the information handling system. For example, IHS 110 may restore the stored information to volatile memory medium 150, from non-volatile memory medium 160. In one or more embodiments, the information handling system may have stored the stored information, that was stored by the volatile memory medium of the information handling system, via the non-volatile memory medium of the information handling system before the information handling system transitioned to the power conservation state. For example, IHS 110 may have stored the stored information, that was stored by volatile memory medium 150, via non-volatile memory medium 160 before IHS 110 transitioned to the power conservation state. In one or more embodiments, the power conservation state may be or include a hibernate state (e.g., a state "S4").

Figure 4B:
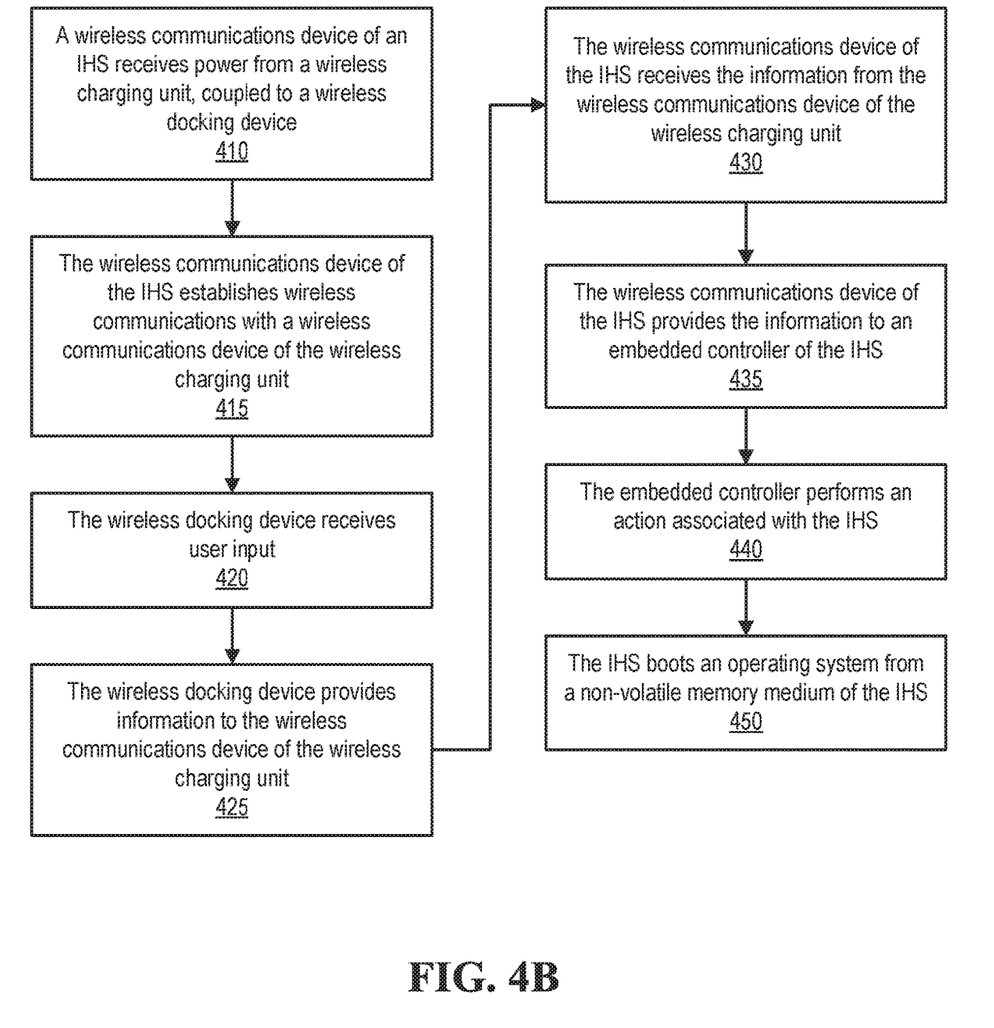

Turning now to FIG. 4B, another method of operating an information handling system, according to one or more embodiments. In one or more embodiments, method elements 410-440 may be performed as described above. At 450, the information handling system may boot an operating system from a non-volatile memory medium of the information handling system. For example, IHS 110 may boot OS 162 from non-volatile memory medium 160. In one or more embodiments, the power conservation state may be or include a soft off state (e.g., a state "S5"). For example, IHS 110 may boot OS 162 from non-volatile memory medium 160 in response to being transitioned from state "S5" to the information processing state (e.g., a state "S0").

Figure 5:
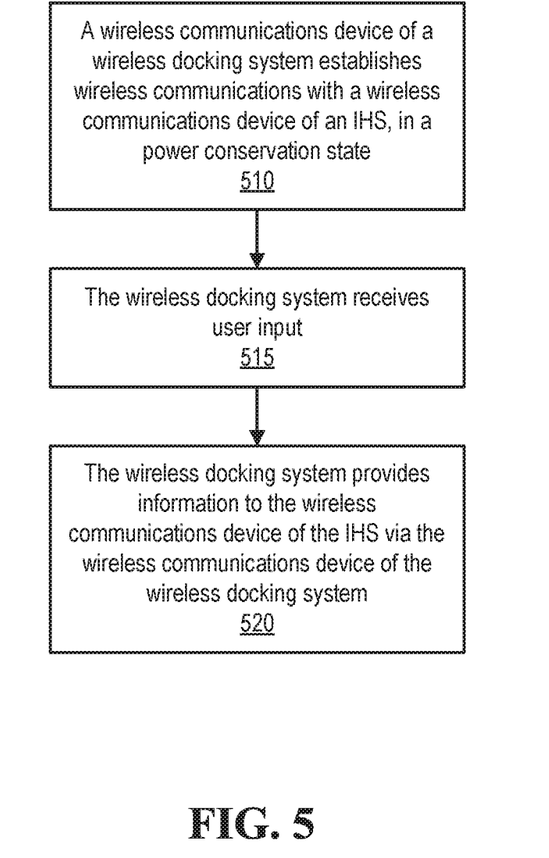
FIG. 5 illustrates a method of operation a wireless docking system, according to one or more embodiments.

Turning now to FIG. 5, a method of operation a wireless docking system is illustrated, according to one or more embodiments. At 510, a wireless communication device of a wireless docking system may establish wireless communications with a wireless communication device of an information handling system. For example, wireless communication device 260 may establish wireless communications with wireless communication device 198. At 515, the wireless docking system may receive user input. For example, wireless docking system 210 may receive user input via one or more of pointing device 310, keyboard 320, and button 330, among others. For instance, a user may actuate button 330 to indicate that IHS 110 is to be transitioned to an information processing state (e.g., "S0").

At 520, the wireless docking system may provide information to the wireless communication device of the information handling system via the wireless communication device of the wireless docking system. For example, wireless docking system 210 may provide the information to wireless communication device 198 via wireless communication device 260. In one instance, wireless docking system 210 may provide the information to wireless communication device 198 in response to the user input. In another instance, wireless docking system 210 may provide the information to wireless communication device 198 based at least on the user input. In one or more embodiments, the information may include a state transition command. For example, wireless docking system 210 may provide a state transition command to wireless communication device 198 via wireless communication device 260. In one instance, wireless docking system 210 may provide a state transition command to wireless communication device 198 in response to the user input. In another instance, wireless docking system 210 may provide a state transition command to wireless communication device 198 based at least on the user input.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a first processor;
   a first non-volatile memory medium, coupled to the first processor, that stores instructions executable by the first processor;
   a volatile memory medium coupled to the first processor;
   a wireless power receiver;
   a microcontroller coupled to the first processor;
   a wireless communications device coupled to the wireless power receiver and coupled to the microcontroller; and
   a power supply configured to provide power to components of the information handling system;
   wherein the microcontroller includes a second processor and a second non-volatile memory medium, which stores instructions executable by the second processor;
   wherein the information handling system is configured to utilize an information processing state and a hibernate state, wherein, in the hibernate state, the first processor does not execute the instructions and the volatile memory medium was flushed to the non-volatile memory medium;
   wherein the wireless power receiver is configured to receive power via one or more magnetic fields of a wireless charging unit and is configured to provide power to the wireless communications device from the one or more magnetic fields;
   wherein, while the information handling system is in the hibernate state, the wireless communications device is configured to:

draw power from the wireless power receiver without drawing power from the power supply;
wirelessly communicate with another wireless communications device of the wireless charging unit;
wirelessly receive a state transition command from the other wireless communication device of the wireless charging unit; and
provide the state transition command to the microcontroller;
wherein, while the information handling system is in the hibernate state, the microcontroller is configured to operate independently of the first processor to:
receive the state transition command from the wireless communications device; and
transition the information handling system from the hibernate state to the information processing state in response to the state transition command, wherein in the information processing state, the first processor executes instructions; and
wherein the information handling system is configured to restore, from the first non-volatile memory medium, the volatile memory medium that was flushed to the first non-volatile memory medium, in response to being transitioned from the hibernate state to the information processing state.

2. The information handling system of claim 1,
wherein the instructions include an operating system; and
wherein the information handling system is configured to boot the operating system from the first non-volatile memory medium in response to being transitioned from the hibernate state to the information processing state.

3. The information handling system of claim 1,
wherein the wireless communications device includes a first Bluetooth communications device; and
wherein the other wireless communications device includes a second Bluetooth communications device, different from the first Bluetooth communications device.

4. The information handling system of claim 1, wherein microcontroller includes an integrated circuit that includes the second processor and the second non-volatile memory medium.

5. A method, comprising:
an information handling system transitioning to a hibernate state, wherein, in the hibernate state, a first processor of the information handling system does not execute instructions, wherein the information handling system includes the first processor and a first non-volatile memory medium, which stores instructions executable by the first processor; and
while the information handling system is in the hibernate state:
a wireless communications device of the information handling system receiving wireless power from a wireless charging unit, coupled to a wireless docking device, wherein the wireless communications device of the information handling system draws power from the wireless charging unit without drawing power from a power supply of the information handling system;
in response to the wireless communications device of the information handling system receiving the wireless power from the wireless charging unit, the wireless communications device of the information handling system establishing wireless communications with a wireless communications device of the wireless charging unit;
the wireless communications device of the information handling system wirelessly receiving a state transition command from the wireless communications device of the wireless charging unit;
the wireless communications device of the information handling system providing the a state transition command to a microcontroller of the information handling system, wherein the microcontroller includes a second processor and a second non-volatile memory medium, which stores instructions executable by the second processor;
the microcontroller receiving, independently of the first processor, the state transition command from the wireless communications device; and
the microcontroller transitioning, independently of the first processor, the information handling system from the hibernate state to an information processing state in response to the state transition command, wherein in the information processing state, the first processor executes the instructions; and
in response to being transitioned from the hibernate state to the information processing state, the information handling system restoring, from the first non-volatile memory medium, a volatile memory medium of the information handling system that was flushed to the first non-volatile memory medium.

6. The method of claim 5, further comprising:
in response to being transitioned from the hibernate state to the information processing state, the information handling system booting an operating system from the first non-volatile memory medium.

7. The method of claim 5, wherein a wireless docking system includes the wireless charging unit and the wireless docking device.

8. The method of claim 5,
wherein the wireless communications device of the information handling system includes a first Bluetooth communications device; and
wherein the wireless communications device of the wireless charging unit includes a second Bluetooth communications device, different from the first Bluetooth communications device.

9. The method of claim 5, wherein microcontroller includes an integrated circuit that includes the second processor and the non-volatile memory medium.

* * * * *